United States Patent
Arai et al.

(10) Patent No.: US 9,434,811 B2
(45) Date of Patent: *Sep. 6, 2016

(54) EPOXY RESIN COMPOSITION FOR USE IN A CARBON-FIBER-REINFORCED COMPOSITE MATERIAL, PREPREG, AND CARBON-FIBER-REINFORCED COMPOSITE MATERIAL

(75) Inventors: Atsuhito Arai, Ehime (JP); Hiroaki Sakata, Ehime (JP); Hiroshi Taiko, Ehime (JP); Michiya Ishikawa, Moriyama (JP); Hidetoshi Kato, Moriyama (JP); Jiro Nakatani, Moriyama (JP)

(73) Assignee: TORAY INDUSTRIES, INC., Tokyo (JP)

( * ) Notice: Subject to any disclaimer, the term of this patent is extended or adjusted under 35 U.S.C. 154(b) by 588 days.

This patent is subject to a terminal disclaimer.

(21) Appl. No.: 13/634,518

(22) PCT Filed: Dec. 24, 2010

(86) PCT No.: PCT/JP2010/073335
§ 371 (c)(1),
(2), (4) Date: Sep. 12, 2012

(87) PCT Pub. No.: WO2011/118106
PCT Pub. Date: Sep. 29, 2011

(65) Prior Publication Data
US 2013/0005855 A1 Jan. 3, 2013

(30) Foreign Application Priority Data
Mar. 23, 2010 (JP) .................. 2010-065662

(51) Int. Cl.
*C08G 59/22* (2006.01)
*C08G 59/28* (2006.01)
*C08G 59/32* (2006.01)
*C08G 59/38* (2006.01)
*C08J 5/24* (2006.01)
*C08L 63/00* (2006.01)

(52) U.S. Cl.
CPC ............ *C08G 59/3227* (2013.01); *C08J 5/24* (2013.01); *C08L 63/00* (2013.01); *C08J 2363/00* (2013.01); *C08L 2205/02* (2013.01)

(58) Field of Classification Search
USPC ........................................ 523/427; 525/526
See application file for complete search history.

(56) References Cited

FOREIGN PATENT DOCUMENTS

| JP | 62077376 A | * | 4/1987 |
|---|---|---|---|
| JP | 62124110 A | * | 6/1987 |
| JP | 2-169618 A | | 6/1990 |
| JP | 02169618 A | * | 6/1990 |
| JP | 3-26750 A | | 2/1991 |
| JP | 03026750 A | * | 2/1991 |
| JP | 4-356521 A | | 12/1992 |
| JP | 2002-363253 A | | 12/2002 |
| JP | 2003-26768 A | | 1/2003 |
| JP | 2006-265458 A | | 10/2006 |
| JP | 2006265458 A | * | 10/2006 |
| JP | 2010-59225 A | | 3/2010 |
| WO | WO 2010/109929 A1 | | 9/2010 |

OTHER PUBLICATIONS

STN Cas Registry No. 129998-27-2 (2015).*
International Search Report issued in PCT/JP2010/073335, dated Mar. 15, 2011.
Official Letter from JPO regarding the corresponding Japanese Application JP 2010-550961.

* cited by examiner

*Primary Examiner* — Randy Gulakowski
*Assistant Examiner* — Ha S Nguyen
(74) *Attorney, Agent, or Firm* — Birch, Stewart, Kolasch & Birch, LLP

(57) ABSTRACT

Disclosed is a carbon-fiber-reinforced composite material that is suitable for use as a construction material and exhibits high mechanical strength in harsh usage environments such as low-temperature environments and high-temperature moisture-absorbing environments. Also disclosed are an epoxy resin composition for producing the aforementioned carbon-fiber-rein-forced composite material and a prepreg obtained through the use of said epoxy resin composition. Said epoxy resin composition comprises at least the following constituents, by mass with respect to the total mass of the composition: (A) between 20% and 80% of an epoxy resin having the structure represented by formula (1); and (B) between 10% and 50% of an epoxy resin that has at least two ring structures with four or more members each and also has one amine glycidyl or ether glycidyl directly connected to a ring structure.

6 Claims, No Drawings

EPOXY RESIN COMPOSITION FOR USE IN A CARBON-FIBER-REINFORCED COMPOSITE MATERIAL, PREPREG, AND CARBON-FIBER-REINFORCED COMPOSITE MATERIAL

TECHNICAL FIELD

The present invention relates to an epoxy resin composition for use in a carbon fiber reinforced composite material (hereinafter may be simply referred to as "epoxy resin composition"), prepreg and carbon fiber reinforced composite material. In more detail, the invention relates to an epoxy resin composition capable of being processed into carbon fiber reinforced composite materials excellent in mechanical strength under severe service environments such as low temperature and high temperature hygroscopic conditions and suitable as structural materials, and also to a prepreg and a carbon fiber reinforced composite material.

In recent years, carbon fiber reinforced composite materials using carbon fibers as reinforcing fibers, owing to the high specific strength and specific elastic modulus thereof, have been being used as structural materials of aircraft, motor vehicles and the like, sporting goods such as tennis rackets, golf shafts and fishing rods, general industrial uses, etc.

Methods for producing the carbon fiber reinforced composite materials include a method of curing a prepreg obtained as a sheet-like intermediate material comprising reinforcing fibers impregnated with an uncured matrix resin, a resin transfer molding method of pouring a liquid resin into the reinforcing fibers disposed in a mold, to obtain an intermediate product and curing it, etc. Among these production methods, in the method of using a prepreg, usually multiple sheets of a prepreg are laminated and subsequently heated and pressurized to obtain a carbon fiber reinforced composite material. As the matrix resin used in the prepreg, in the light of productivity such as processability, thermosetting resins, particularly epoxy resins are often used.

Above all, for applications as structural materials of aircraft, motor vehicles and the like, the carbon fiber reinforced composite materials are increasingly used in recent years, and accordingly the properties required for the carbon fiber reinforced composite materials become severe. In particular, for applications as structural materials of aircraft members, motor vehicle members and the like, the carbon fiber reinforced composite materials are required to have higher strength under more server service environments such as high temperature/high humidity and low temperature.

In the prior art, if it is attempted to enhance the tensile strength under low temperature conditions, the compressive strength under high temperature/high humidity conditions is often impaired, and on the contrary, if it is attempted to enhance the compressive strength under high temperature/high humidity conditions, the tensile strength under low temperature conditions is often impaired. Thus, it has been very difficult to achieve both high tensile strength and high compressive strength.

In order to enhance the tensile strength of a carbon fiber reinforced composite material, it is effective to enhance the strength of the reinforcing fibers and to enhance the fiber volume percentage (to enhance Vf). In the past, a method for obtaining reinforcing fibers with high strength was proposed (see patent document 1), but this proposal does not refer to the strength exhibited as a carbon fiber reinforced composite material. In general, if the strength of reinforcing fibers is higher, it tends to be more difficult to use the strength peculiar to the fibers. Further, it is known that even if the strength of reinforcing fibers remains identical, the tensile strength availability greatly varies depending on the matrix resin used in combination or on molding conditions. In particular, if the curing temperature is 180° C. or higher, there is a problem that high strength is unlikely to be exhibited owing to the thermal stress/strain remaining in the fiber reinforced composite material at the time of curing. Consequently, even if carbon fibers with such high strength can be obtained, further technical problems must be solved in order that a carbon fiber reinforced composite material can exhibit strength.

It is demonstrated that high tensile strength availability can be obtained if the tensile elongation at break and the fracture toughness (KIc) of the matrix resin comply with a specific relationship (see patent document 2). However, if a large amount of a thermoplastic resin or rubber component is mixed with the matrix resin in order to enhance the fracture toughness (KIc), in general the viscosity rises, and the processability in prepreg production and handling properties may be impaired.

Further, in the case where a carbon fiber reinforced composite material is used as a structural material, compressive strength is also an important physical property. For measuring the compressive strength, such specimens as a non-perforated plate, perforated plate, cylinder and the like are used. Since plates with bolt holes are often used in actual applications, the compressive strength of a perforated plate, above all, the strength under high temperature/high humidity conditions is especially important. However, composite materials obtained by using conventional polymers as matrixes decline in strength and elastic modulus under high temperature/high humidity conditions, thus being likely to greatly decline in compressive strength, and are consequently limited in applicable areas, though they have an advantage of light weight.

As resin compositions capable of being processed into carbon fiber reinforced composite materials with excellent compressive strength, disclosed are an epoxy resin composition comprising tetraglycidyldiaminodiphenylmethane, bifunctional epoxy resin such as bisphenol A type epoxy resin or diglycidyl resorcinol and 3,3'-diaminodiphenylsulfone (see patent document 3), an epoxy resin composition containing a polyfunctional epoxy resin, diglycidylaniline derivative and 4,4'-diaminodiphenylsulfone (see patent document 4), and an epoxy resin composition containing a polyfunctional epoxy resin, epoxy resin with a special skeleton and 3,3'-diaminodiphenylsulfone (see patent document 5). These epoxy resin compositions can achieve higher compressive strength, but the respective documents do not refer to the enhancement of tensile strength at low temperature at all.

PRIOR ART DOCUMENTS

Patent Documents

Patent document 1: JP 11-241230 A
Patent document 2: JP 9-235397 A
Patent document 3: WO 1996/17006
Patent document 4: JP 2003-26768 A
Patent document 5: JP 2002-363253 A

SUMMARY OF THE INVENTION

Problem to be Solved by the Invention

Such being the case, the object of this invention is to provide an epoxy resin composition capable of being processed into a carbon fiber reinforced composite material excellent in tensile and compressive mechanical strengths and suitable as a structural material, and also to provide a prepreg and a carbon fiber reinforced composite material.

Means for Solving the Problem

This invention has the following configuration for achieving the above-mentioned object: that is, an epoxy resin composition for use in a carbon fiber reinforced composite material, containing at least the following components [A] and [B], wherein the content of [A] is 20 to 80 mass % and the content of [B] is 10 to 50 mass % per 100 mass % as the total amount of the mixed epoxy resins.

[A] An epoxy resin with one or more amine type glycidyl groups at the meta position(s), having the structure represented by the following general formula (1):

[Chemical formula 1]

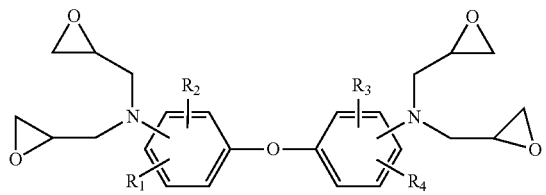

(1)

[B] An epoxy resin with two or more four- or larger-membered ring structures and one amine type glycidyl group or ether type glycidyl group directly bonded to one of the ring structures (where each of $R_1$ to $R_4$ denotes at least one selected from the group consisting of hydrogen atom, aliphatic hydrocarbon group with 1 to 4 carbon atoms, alicyclic hydrocarbon group with 4 or less carbon atoms, and halogen atoms).

Further, in this invention, the aforementioned epoxy resin composition can be cured into a cured resin product, or can be processed into a carbon fiber reinforced composite material containing carbon fibers, or can also be impregnated into carbon fibers, to produce a prepreg, and the prepreg can be further cured to produce a carbon fiber reinforced composite material.

Effects of the Invention

According to this invention, an epoxy resin composition excellent in heat resistance and also excellent in the processability for producing a prepreg can be obtained. The epoxy resin composition and carbon fibers can be combined to obtain a prepreg, and further, a carbon fiber reinforced composite material excellent in tensile strength and compressive strength can be obtained by curing the epoxy resin composition of the prepreg.

MODES FOR CARRYING OUT THE INVENTION

The epoxy resin composition, prepreg and carbon fiber reinforced composite material of this invention are explained below in detail.

The present inventors made an intensive study on the mechanism in which a carbon fiber reinforced composite material exhibits tensile strength and compressive strength, and as a result, found that a structure most suitable for obtaining both high tensile strength and high compressive strength, properties hitherto contradictory to each other, can be obtained by an epoxy resin composition containing the epoxy resin [A] represented by the aforementioned formula (1) and the epoxy resin [B] having two or more four- or larger-membered ring structures and one amine type glycidyl group or ether type glycidyl group directly bonded to one of the ring structures at a specific content ratio.

Each of $R_1$, $R_2$, $R_3$ and $R_4$ of the epoxy resin [A] having the structure represented by formula (1) contained in the epoxy resin composition of this invention denotes a hydrogen atom, aliphatic hydrocarbon group with 1 to 4 carbon atoms or alicyclic hydrocarbon group with 4 or less carbon atoms, and halogen atoms. If the structures of $R_1$, $R_2$, $R_3$ and $R_4$ are too large, the viscosity of the epoxy resin composition becomes so high as to impair handling properties or the compatibility with the other components of the epoxy resin composition, and the effect of enhancing strength may not be obtained.

Meanwhile, the epoxy resin having one or more amine type glycidyl groups at the meta position(s) in this invention means an epoxy resin in which the amine type glycidyl group(s) is/are bonded to the carbon at the 3-position or 3'-position and/or the carbon at the 5-position or 5'-position if the position of the carbon on the benzene ring to which the ether groups of the aforementioned formula (1) are bonded is the 1-position.

As examples of the epoxy resin [A], enumerated are tetraglycidyl-3,4'-diaminodiphenylether, tetraglycidyl-3,3'-diaminodiphenylether, tetraglycidyl-3,4'-diamino-2,2'-dimethyldiphenylether, tetraglycidyl-3,4'-diamino-2,2'-dibromodiphenylether, tetraglycidyl-3,4'-diamino-5-methyldiphenylether, tetraglycidyl-3,4'-diamino-2'-methyldiphenylether, tetraglycidyl-3,4'-diamino-3'-methyldiphenylether, tetraglycidyl-3,4'-diamino-5,2'-dimethyldiphenylether, tetraglycidyl-3,4'-diamino-5,3'-dimethyldiphenylether, tetraglycidyl-3,3'-diamino-5-methyldiphenylether, tetraglycidyl-3,3'-diamino-5,5'-dimethyldiphenylether, tetraglycidyl-3,3'-diamino-5,5'-dibromodiphenylether, etc.

Among them, it is preferred that each of $R_1$, $R_2$, $R_3$ and $R_4$ denotes a hydrogen atom in view of the compatibility with the other epoxy resins, and more preferred in view of heat resistance is tetraglycidyl-3,4'-diaminodiphenylether or tetraglycidyl-3,3'-diaminodiphenylether. Further, in view of flame retardancy, any of them substituted by a halogen atom such as Cl or Br is also preferred.

An example of the method for producing the epoxy resin [A] used in this invention is explained below.

The epoxy resin [A] used in this invention can be produced by reacting a diaminodiphenylether derivative represented by the following general formula (2)

[Chemical formula 2]

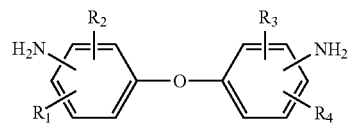

(2)

(where each of $R_1$ to $R_4$ denotes at least one selected from the group consisting of hydrogen atom, aliphatic hydrocarbon group with 1 to 4 carbon atoms, alicyclic hydrocarbon group with 4 or less carbon atoms, and halogen atoms) with epichlorohydrin.

That is, like the method for producing a general epoxy resin, the method for producing the epoxy resin [A] comprises an addition step of adding four molecules of epichlorohydrin to one molecule of the diaminodiphenylether derivative, to produce a dichlorohydrin compound represented by the following general formula (3)

[Chemical formula 3]

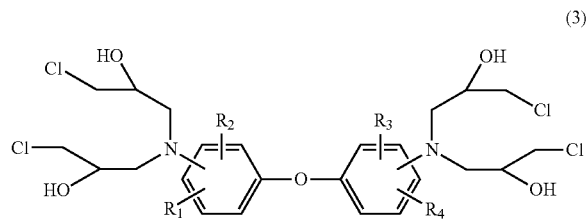

(3)

(where each of $R_1$ to $R_4$ denotes at least one selected from the group consisting of hydrogen atom, aliphatic hydrocarbon group with 1 to 4 carbon atoms, alicyclic hydrocarbon group with 4 or less carbon atoms, and halogen atoms) and a subsequent cyclization step of producing an epoxy compound represented by the following general formula (1)

[Chemical formula 4]

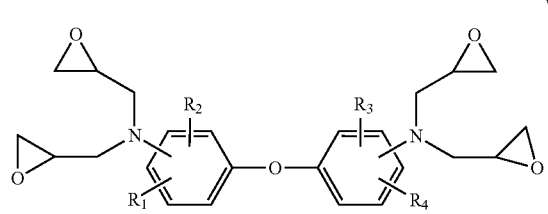

(1)

(where each of $R_1$ to $R_4$ denotes at least one selected from the group consisting of hydrogen atom, aliphatic hydrocarbon group with 1 to 4 carbon atoms, alicyclic hydrocarbon group with 4 or less carbon atoms, and halogen atoms) as a tetrafunctional epoxy compound by removing hydrogen chloride from the dichlorohydrin compound using an alkali compound.

If the mixed amount of the epoxy resin [A] is too small, heat resistance is impaired. If the amount is too large, the crosslinking density becomes so high that the material may become brittle, and the impact resistance and strength of the carbon fiber reinforced composite material may be impaired. It is necessary that the mixed amount of the epoxy resin [A] is 20 to 80 mass % per 100 mass % as the total amount of the mixed epoxy resins. A preferred range is 30 to 75 mass %.

That the epoxy resin [B] contained in the epoxy resin composition of this invention has two or more four- or larger-membered ring structures means that the epoxy resin [B] has two or more four- or larger-membered monocyclic structures like those of cyclohexane, benzene and pyridine, or at least one or more four- or larger-membered condensed ring structures like those of phthalimide, naphthalene and carbazole.

Further, the amine type glycidyl group or ether type glycidyl group directly bonded to one of the ring structures of the epoxy resin [B] means a structure in which an N atom in the case of amine type or an O atom in the case of ether type is bonded to the ring structure of benzene, phthalimide or the like. In case of amine type, a monofunctional or bifunctional epoxy resin is used, and in case of ether type, a monofunctional epoxy resin is used.

If the mixed amount of the epoxy resin [B] is too small, there is little effect of enhancing the strength of the carbon fiber reinforced composite material, and if the amount is too large, heat resistance is remarkably impaired. Therefore, it is necessary that the mixed amount of [B] is 10 to 50 mass % based on the total amount of the mixed epoxy resins. Further, as [B], a monofunctional epoxy resin is more excellent in the effect of exhibiting strength, and a bifunctional epoxy resin is more excellent in heat resistance. Therefore, with regard to the mixed amount of [B], it is more preferred that the amount of the monofunctional epoxy resin is 10 to 40 mass % based on the total amount of mixed epoxy resins, and that the amount of the bifunctional epoxy resin is 25 to 50 mass % based on the total amount of mixed epoxy resins.

As examples of the epoxy resin [B], enumerated are glycidylphthalimide, glycidyl-1,8-naphthalimide, glycidylcarbazole, glycidyl-3,6-dibromocarbazole, glycidylindole, glycidyl-4-acetoxyindole, glycidyl-3-methylindole, glycidyl-3-acetylindole, glycidyl-5-methoxy-2-methylindole, o-phenylphenyl glycidyl ether, p-phenylphenyl glycidyl ether, p-(3-methylphenyl)phenyl glycidyl ether, 2,6-dibenzylphenyl glycidyl ether, 2-benzylphenyl glycidyl ether, 2,6-diphenylphenyl glycidyl ether, 4-α-cumylphenyl glycidyl ether, o-phenoxyphenyl glycidyl ether, p-phenoxyphenyl glycidyl ether, diglcidyl-1-aminonaphthalene, diglycidyl-p-phenoxyaniline, diglycidyl-4-(4-methylphenoxy)aniline, diglycidyl-4-(3-methylphenoxy)aniline, diglycidyl-4-(2-methylphenoxy)aniline, diglycidyl-4-(4-ethylphenoxy)aniline, diglycidyl-4-(3-ethylphenoxy)aniline, diglycidyl-4-(2-ethylphenoxy)aniline, diglycidyl-4-(4-propylphenoxy)aniline, diglycidyl-4-(4-tert-butylphenoxy)aniline, diglycidyl-4-(4-cyclohexylphenoxy)aniline, diglycidyl-4-(3-cyclohexylphenoxy)aniline, diglycidyl-4-(2-cyclohexylphenoxy)aniline, diglycidyl-4-(4-methoxyphenoxy)aniline, diglycidyl-4-(3-methoxyphenoxy)aniline, diglycidyl-4-(2-methoxyphenoxy)aniline, diglycidyl-4-(3-phenoxyphenoxy)aniline, diglycidyl-4-(4-phenoxyphenoxy)aniline, diglycidyl-4-[4-(trifluoromethyl)phenoxy]aniline, diglycidyl-4-[3-(trifluoromethyl)phenoxy]aniline, diglycidyl-4-[2-(trifluoromethyl)phenoxy]aniline, diglycidyl-p-(2-naphthyloxyphenoxy)aniline, diglycidyl-p-(1-naphthyloxyphenoxy)aniline, diglycidyl-4-[(1,1'-biphenyl-4-yl)oxy]aniline, diglycidyl-4-(4-nitrophenoxy)aniline, diglycidyl-4-(3-nitrophenoxy)aniline diglycidyl-4-(2-nitrophenoxy)aniline, diglycidyl-4-(4-methylphenoxy)aniline diglycidyl-4-(3-methylphenoxy)aniline, diglycidyl-4-(2-methylphenoxy)aniline, diglycidyl-4-(4-ethylphenoxy)aniline, diglycidyl-4-(3-ethylphenoxy)aniline, diglycidyl-4-(4-tert-butylphenoxy)aniline, diglycidyl-4-(4-cyclohexylphenoxy)aniline, diglycidyl-p-(2-naphthyloxyphenoxy)aniline, etc.

Commercially available products of the epoxy resin[B] include "Denacol®" Ex-731 (glycidylphthalimide produced by Nagase ChemteX Corporation), OPP-G (o-phenylphenyl glycidyl ether produced by SANKO Co., Ltd.), PxGAN (diglycidyl-p-phenoxyaniline produced by Toray Fine Chemicals Co., Ltd.), etc.

In this invention, a further other epoxy resin than [A] an [B], a copolymer consisting of an epoxy resin and a thermosetting resin, or the like can also be contained. As examples of the abovementioned thermosetting resin used together with an epoxy resin in the copolymer, enumerated are an unsaturated polyester resin, vinyl ester resin, epoxy resin, benzoxazine resin, phenol resin, urea resin, melamine resin, polyimide resin, etc. Any one of these resin compositions and compounds can also be used alone or two or more of them can also be mixed as appropriate. When at least a further other epoxy than [A] and [B] is mixed, it should be intended to assure resin flowability and the heat resistance after curing.

Among the epoxy resins usable as the other epoxy resin than [A] and [B], as a bifunctional epoxy resin, a glycidyl ether type epoxy resin with phenol as the precursor thereof can be preferably used. Examples of such an epoxy resin include bisphenol A type epoxy resin, bisphenol F type epoxy resin, bisphenol S type epoxy resin, naphthalene type epoxy resin, biphenyl type epoxy resin, urethane-modified epoxy resin, hydantoin type epoxy resin, resorcinol type epoxy resin, etc.

It is preferred to use a liquid bisphenol A type epoxy resin, bisphenol F type epoxy resin, or resorcinol type epoxy resin in combination with another epoxy resin, since the liquid resin has low viscosity.

Further, a solid bisphenol A type epoxy resin gives a structure with a low crosslinking density compared with a liquid bisphenol A type epoxy resin, and consequently lowers the heat resistance. However, it is used in combination with a glycidylamine type epoxy resin, liquid bisphenol A type epoxy resin or bisphenol F type epoxy resin, since a structure with higher toughness can be obtained.

An epoxy resin having a naphthalene skeleton gives a cured resin with a low water absorption coefficient and high heat resistance. Further, a biphenyl type epoxy resin, dicyclopentadiene type epoxy resin, phenol aralkyl type epoxy resin and diphenyl fluorene type epoxy resin can also be used suitably, since they give cured resins with a low water absorption coefficient. A urethane-modified epoxy resin and isocyanate-modified epoxy resin give cured resins with high fracture toughness and elongation.

Commercially available products of the bisphenol A type epoxy resin include "EPON®" 825 (produced by Japan Epoxy Resin Co., Ltd.), "EPICLON®" 850 (produced by DIC Corporation), "Epototo®" YD-128 (produced by Toto Kasei K. K.), DER-331 and DER-332 (respectively produced by Dow Chemical Company), etc.

Commercially available products of the bisphenol F type epoxy resin include "jER®" 806, "jER®" 807 and "jER®" 1750 (respectively produced by Japan Epoxy Resin Co., Ltd.), "EPICLON®" 830 (produced by DIC Corporation) and "Epototo®" YD-170 (produced by Toto Kasei K. K.), etc.

Commercially available products of the resorcinol type epoxy resin include "Denacol®" EX-201 (Nagase ChemteX Corporation), etc.

Commercially available products of the glycidylaniline type epoxy resin include GAN and GOT (respectively produced by Nippon Kayaku Co., Ltd.), etc.

Commercially available products of the biphenyl type epoxy resin include NC-3000 (produced by Nippon Kayaku Co., Ltd.), etc.

Commercially available products of the urethane-modified epoxy resin include AER4152 (produced by Asahi Kasei Epoxy Co., Ltd.), etc.

Commercially available products of the hydantoin type epoxy resin include AY238 (produced by Huntsman Advanced Materials), etc.

Among the epoxy resins usable as the epoxy resin other than [A] and [B], examples of tri- or higher-functional glycidylamine type epoxy resin include diaminodiphenylmethane type, diaminodiphenylsulfone type, aminophenol type, methaxylenediamine type, 1,3-bisaminomethylcyclohexane type and isocyanurate type epoxy resins, etc. Among them in view of good balance of physical properties, diaminodiphenylmethane type and aminophenol type epoxy resins can be especially preferably used.

Further, examples of tri- or higher-functional glycidyl ether type epoxy resin include phenol novolac type, orthocresol novolac type, tris-hydroxyphenyl methane type and tetraphenylolethane type epoxy resins, etc.

If the mixed amount of tri- or higher-functional epoxy resins including the epoxy resin [A] is too small, heat resistance is impaired. If the amount is too large, the crosslinking density becomes high and the material may be brittle. Hence the impact resistance and strength of the carbon fiber reinforced composite material may be impaired. It is preferred that the mixed amount of tri- or higher-functional epoxy resins including the epoxy resin [A] is 40 to 80 mass % per 100 mass % of the amount of the epoxy resins [A] and [B] and other epoxy resins than [A] and [B] (total amount of epoxy resins). A more preferred range is 50 to 70 mass %.

Among commercially available products of the tri- or higher-functional epoxy resins, those of the diaminodiphenylmethane type epoxy resin include ELM434 (produced by Sumitomo Chemical Co., Ltd.), "Araldite®" MY720, "Araldite®" MY721, "Araldite®" MY9512, "Araldite®" MY9663 (respectively produced by Huntsman Advanced Materials), and "Epototo®" YH-434 (produced by Toto Kasei K. K.), etc.

Commercially available products of the methaxylenediamine type epoxy resin include TETRAD-X (produced by Mitsubishi Gas Chemical Co., Inc.).

Commercially available products of the 1,3-bisaminomethylcyclohexane type epoxy resin include TETRAD-C (produced by Mitsubishi Gas Chemical Co., Inc.).

Commercially available products of the isocyanurate type epoxy resin include TEPIC-P (produced by Nissan Chemical Industries, Ltd.)

Commercially available products of the tris-hydroxyphenylmethane type epoxy resin include Tactix742 (produced by Huntsman Advanced Materials).

Commercially available products of the tetraphenylolethane type epoxy resin include "jER®" 1031S (produced by Japan Epoxy Resin Co., Ltd.).

Commercially available products of the aminophenol type epoxy resin include ELM120 and ELM100 (respectively produced by Sumitomo Chemical Co., Ltd.), "jER®" 630 (produced by Japan Epoxy Resin Co., Ltd.), and Araldite®" MY0510 (produced by Huntsman K. K.), "Araldite®" MY0600 (produced by Huntsman K. K.), "Araldite®" MY0610 (produced by Huntsman K K), etc.

Commercially available products of the phenol novolac type epoxy resin include DEN431 and DEN438 (respectively produced by Dow Chemical Company) and "jER®" 152 (produced by Japan Epoxy resin Co., Ltd.), etc.

Commercially available products of the orthocresol novolac type epoxy resin include EOCN-1020 (produced by Nippon Kayaku Co., Ltd.) and "EPICLON®" N-660 (produced by DIC Corporation), etc.

Commercially available products of the dicyclopentadiene type epoxy resin include "EPICLON®" HP7200 (produced by DIC Corporation), etc.

It is good to mix a curing agent with the epoxy resin composition for use in a carbon fiber reinforced composite material of this invention. The curing agent referred to here is the curing agent of the epoxy resins contained in the epoxy resin composition of this invention, being a compound having an active group capable of reacting with an epoxy group. As examples of the curing agent, enumerated are dicyandiamide, aromatic polyamines, aminobenzoic acid esters, various acid anhydrides, phenol novolac resin, cresol novolac resin, polyphenol compounds, imidazole derivatives, aliphatic amines, tetramethylguanidine, thiourea-added amines, carboxylic anhydrides such as methylhexahydrophthalic anhydride, carboxylic acid hydrazides, carboxylic acid amides, polymercaptan and Lewis acid complexes such as boron trifluoride ethylamine complex, etc.

If an aromatic polyamine is used as the curing agent, a cured epoxy resin product with good heat resistance can be obtained. In particular, among the aromatic polyamines, various isomers of diaminodiphenylsulfone are curing agents most suitable for obtaining cured epoxy resin products with good heat resistance.

Further, in the case where a combination consisting of dicyanediamide and a urea compound such as 3,4-dichlorophenyl-1,1-dimethylurea, or an imidazole is used as a curing agent, high heat resistance and high water resistance can be obtained even if the curing is performed at a relatively low temperature. In the case where an acid anhydride is used to cure epoxy resins, a cured product with a water absorption coefficient lower than that of a cured product obtained by using an amine compound can be obtained. Further, in the case where any of these curing agents made latent, for example, a microencapsulated curing agent is used, the storage stability, particularly tackiness and drapability of the prepreg are unlikely to be changed even if the prepreg is allowed to stand at room temperature.

The optimum value of the added amount of the curing agent depends on the epoxy resins and the curing agent used. For example, in case the case where an aromatic amine is used as the curing agent, it is preferred to add a stoichiometrically equivalent amount. However, keeping the ratio of the amount of active hydrogen of the aromatic amine as the curing agent to the amount of the epoxy groups of the epoxy resins at approx. 0.7 to approx. 0.9 is also a preferred mode, since a resin with an elastic modulus higher than that of the resin obtained by adding an equivalent amount can be obtained. Any one of these curing agents can be used alone or two or more of them can also be used together.

Commercially available products of the aromatic polyamine used as a curing agent include SEIKACURE-S (produced by Wakayama Seika Kogyo Co., Ltd.), MDA-220 (produced by Mitsui Chemicals, Inc.), "jER Cure®" W (produced by Japan Epoxy Resin Co., Ltd.), and 3,3'-DAS (produced by Mitsui Chemicals, Inc.), "Lonzacure®" M-DEA (produced by Lonza K. K.), "Lonzacure®" M-DIPA (produced by Lonza K. K.), "Lonzacure®" M-MIPA (produced by Lonza K. K.) and "Lonzacure®" DETDA 80 (produced by Lonza K. K), etc.

Further, a product obtained by preliminarily reacting the epoxy resins and curing agent or reacting some of them can also be mixed into the composition. This method may be effective for viscosity adjustment and storage stability enhancement as the case may be.

In this invention, mixing or dissolving a thermoplastic resin into the above-mentioned epoxy resin composition is also a suitable mode. As the thermoplastic resin, in general, a thermoplastic resin having bonds selected from the group consisting of carbon-carbon bonds, amide bonds, imide bonds, ester bonds, ether bonds, carbonate bonds, urethane bonds, thioether bonds, sulfone bonds and carbonyl bonds in the main chain is preferred. Further, the thermoplastic resin can also partially have a crosslinked structure or can also be crystalline or amorphous. In particular, it is suitable that at least one resin selected from the group consisting of polyamide, polycarbonate, polyacetal, polyphenylene oxide, polyphenylene sulfide, polyallylate, polyester, polyamideimide, polyimide, polyetherimide, polyimide having a phenyltrimethylindane structure, polysulfone, polyethersulfone, polyetherketone, polyetheretherketone, polyaramid, polyethernitrile and polybenzimidazole is mixed or dissolved into any epoxy resin contained in the abovementioned epoxy resin composition.

Especially, in order to obtain good heat resistance, it is preferred that the glass transition temperature (Tg) of the thermoplastic resin is at least 150° C. or higher. More preferred is 170° C. or higher. If the glass transition temperature of the mixed thermoplastic resin is lower than 150° C., the molded article obtained may be likely to be deformed by heat as the case may be when it is used. Further, a thermoplastic resin having hydroxyl groups, carboxyl groups, thiol groups, acid anhydride or the like as the end functional groups can be preferably used, since it can react with a cationic polymerizable compound. Specifically, commercially available products of the polyethersulfone such as "SUMIKAEXEL®" PES3600P, "SUMIKAEXEL®" PES5003P, "SUMIKAEXEL®" PES5200P, "SUMIKAEXEL®" PES7600P (respectively produced by Sumitomo Chemical Co., Ltd.), etc. can be used. Further, a polyethersulfone-polyetherethersulfone copolymer oligomer as described in JP 2004-506789 A, and furthermore commercially available products of the polyetherimide such as "ULTEM®" 1000, "ULTEM®" 1010, "ULTEM®" 1040 (respectively produced by Solvay Advanced Polymers), etc. can also be used. An oligomer refers to a polymer with a relatively low molecular weight in which a finite number of approx. 10 to approx. 100 monomer molecules are bonded to each other.

A mixture consisting of epoxy resins and a thermoplastic resin often gives better results than the use of either the epoxy resins only or the thermoplastic resin only. A well-balanced base resin in which the brittleness of the epoxy resins is covered by the toughness of the thermoplastic resin while the molding difficulty of the thermoplastic resin is covered by the epoxy resins can be obtained. The preferred using rates (parts by mass) of the epoxy resins and the thermoplastic resin in view of balance are 2 to 40 parts by mass of the thermoplastic resin per 100 parts by weight as the total of the mixed epoxy resins. A more preferred range is 5 to 30 parts by mass.

In this invention, it is also suitable that particles of a thermoplastic resin are mixed with the epoxy resin composition of this invention. If the thermoplastic resin particles are mixed, the toughness of the matrix resin in the obtained carbon fiber reinforced composite material is enhanced to enhance the impact resistance.

As the material of the thermoplastic resin particles used in this invention, any of the various thermoplastic resins presented as examples before as the thermoplastic resins that can be mixed or dissolved into the epoxy resin composition can be used. From the viewpoint of giving stable adhesive strength and impact resistance to the fiber reinforced composite material, a thermoplastic resin capable of holding the form in the particles is preferred. Above all, a polyamide is most preferred, and among polyamides, nylon 12, nylon 11 and nylon 6/12 copolymer provide especially good strength adhering to a thermosetting resin. As the form of the thermoplastic resin particles, either spherical particles or aspherical particles, or porous particles can be used. However, spherical particles are a preferred mode for such reasons that since the flow properties of the resin do not decline, excellent viscoelasticity can be given and that since there is no point for initiating stress concentration, high impact resistance can be given. Commercially available products of the polyamide particles include SP500 (produced by Toray Industries, Inc.), "Toraypearl®" TN (produced by Toray Industries, Inc.), "Orgasol®" 1002D (produced by Atochem K. K.), "Orgasol®" 2002 (produced by Atochem K. K.), "Orgasol®" 3202 (produced by Atochem K. K.), etc.

The epoxy resin composition of this invention can contain a coupling agent, thermosetting resin particles, thermoplastic resin dissolvable in the epoxy resins, an inorganic filler such as silica gel, carbon black, clay, carbon nanotubes or metal powder and the like to such an extent that the effects of this invention are not impaired.

As the carbon fibers used in this invention, carbon fibers of any type can be used in response to applications. In view of impact resistance, carbon fibers with a tensile elastic modulus of 400 GPa at the highest are preferred. Further, in view of strength, carbon fibers preferably with a tensile strength of 4.4 to 6.5 GPa can be used, since a composite material with high stiffness and mechanical strength can be obtained. Furthermore, tensile elongation is also an important factor, and high strength and high elongation carbon fibers with a tensile elongation of 1.7 to 2.3% are preferred. Therefore, carbon fibers with such properties as at least 230 GPa tensile elastic modulus, at least 4.4 GPa tensile strength and at least 1.7% tensile elongation are most suitable.

Commercially available products of carbon fibers include "Torayca®" T800G-24K, "Torayca®" T800S-24K, "Torayca®" T810G-24K, "Torayca®" T700G-24K, "Torayca®" T300-3K and "Torayca®" T700S-12K (respectively produced by Toray Industries, Inc.), etc.

The form and arrangement of carbon fibers can be selected, as appropriate, from long fibers paralleled in one direction, woven fabric, etc. However, in order to obtain a carbon fiber reinforced composite material with light weight and a higher level of durability, the form of continuous fibers such as long fibers (fiber bundles) paralleled in one direction or woven fabric is preferred.

As the carbon fiber bundles used in this invention, it is preferred that the number of filaments in one fiber bundle is in a range from 2500 to 50000. If the number of filaments is less than 2500, the arranged fibers are likely to meander, and the decline of strength is likely to be caused. Further, if the number of filaments is more than 50000, it may be difficult to impregnate the fibers with the resin at the time of prepreg production or at the time of molding. A more preferred range of the number of filaments is 2800 to 36000.

The prepreg of this invention is obtained by impregnating the carbon fibers with the epoxy resin composition of this invention. It is preferred that the carbon fiber mass percentage of the prepreg is 40 to 90 mass %, and a more preferred range is 50 to 80 mass %. If the carbon fiber mass percentage is too low, the weight of the obtained composite material becomes so excessive as to impair the advantage of the carbon fiber reinforced composite material excellent in specific strength and specific elastic modulus. Further, if the carbon fiber mass percentage is too high, the impregnation with the resin composition becomes poor, and the obtained composite material is likely to have many voids to greatly lower the mechanical properties thereof.

The prepreg of this invention can be suitably produced by a wet method of dissolving the epoxy resin composition of this invention into a solvent such as methyl ethyl ketone or methanol, and impregnating the reinforcing fibers with the resin composition, or a hot melt method of lowering the viscosity of the epoxy resin composition by heating, and impregnating the reinforcing fibers with the resin composition, etc.

The wet method is a method for obtaining a prepreg by immersing the reinforcing fibers into a solution of the epoxy resin composition and in succession raising the fibers, and further evaporating the solvent by using an oven or the like.

The hot melt method is a method for obtaining a prepreg by impregnating the reinforcing fibers directly with the epoxy resin composition lowered in viscosity by heating, or by coating releasing paper or the like with the epoxy resin composition, to produce a resin film, and overlaying the resin film on each of the two sides or on one side of reinforcing fibers, and further heating and pressuring to transfer the epoxy resin composition for impregnation. The hot melt method is a preferred mode, since the solvent does not remain in the prepreg substantially at all.

Further, the fiber reinforced composite material of this invention can be produced by laminating multiple sheets of the prepreg produced by any method as described above and then heating and curing the epoxy resin composition while applying heat and pressure to the obtained laminate, or the like.

As the method for giving heat and pressure, a press molding method, autoclave molding method, bagging molding method, wrapping tape method, internal pressure molding or the like can be used. In particular, for molding of sporting goods, the wrapping tape method and the internal pressure molding method can be preferably used.

The wrapping tape method is a method for forming a tubular body made of the fiber reinforced composite material by winding the prepreg around a core such as a mandrel, and is suitable for producing a rod-like body such as golf shaft or fishing rod. More specifically, a prepreg is wound around a mandrel, and a wrapping tape formed of a thermoplastic resin film is wound around outside the prepreg for fixing and pressurizing the prepreg. Then in an oven, the epoxy resin composition is heated and cured, and subsequently the core is removed to obtain a tubular body.

Further, in the internal pressure molding method, a preform obtained by winding a prepreg around an inner pressure-applying body such as a thermoplastic resin tube is set in a mold, and subsequently a high pressure gas is introduced into the inner pressure-applying body for applying a pressure, and simultaneously the mold is heated for molding a tubular body. The inner pressure molding method can be especially preferably used in the case where a complicate shape such as a golf shaft, bat or racket of tennis or badminton is produced by molding.

The carbon fiber reinforced composite material of this invention can be produced, for example, by a method of laminating sheets of a prepreg of this invention in a predetermined form, and pressurizing and heating to cure the epoxy resin.

The carbon fiber reinforced composite material of this invention can also be produced by a method without undergoing a prepreg by using the aforementioned epoxy resin composition.

As the method, for example, a method of impregnating the reinforcing fibers directly with the epoxy resin composition of this invention and then heating for curing, i.e., a hand lay-up method, filament winding method, pultrusion method, resin injection molding method, resin transfer molding method, etc. In these methods, a method of mixing one or more main components comprising epoxy resins and one or more curing agents immediately before use, to prepare an epoxy resin composition can be preferably employed.

The carbon fiber reinforced composite material obtained in this invention has a high compressive strength and a high tensile property, i.e., a high tensile strength availability. The tensile strength availability in this case is obtained from the following formula.

(Tensile strength availability of the carbon fiber reinforced composite material)=(Tensile strength of the carbon fiber reinforced composite material)/ ((Strand strength of the carbon fibers)×(Volume content of the carbon fibers))

It is preferred that the tensile strength availability at low temperature (−60° C.) is 75% or more and that the open-hole compression (OGC) strength under high temperature hygroscopic conditions is 240 MPa or higher, since the effect of reducing the weight of the carbon fiber reinforced composite material can be easily exhibited even under severe environmental conditions. Further, it is more preferred that the open-hole compression (OHC) strength under high temperature hygroscopic conditions is 250 MPa or higher, since the design degree of freedom for use as a structural member of aircraft, windmill or the like rises. The fiber volume content can be obtained by the nitric acid decomposition method described in JIS K7075 (1991).

The carbon fiber reinforced composite material of this invention can be preferably used for structural members of aircraft, blades of wind mills, outside plates of motor vehicles, computer applications as IC trays and notebook personal computer housings, and sporting applications such as golf shafts and tennis rackets.

EXAMPLES

The epoxy resin composition of this invention, the prepreg and the carbon fiber reinforced composite material using the same are explained below more specifically in reference to examples. The carbon fibers, starting resin materials, methods for producing prepregs and carbon fiber reinforced composite materials, the method for evaluating the open-hole compression strength and the evaluation method of tensile strength are described below. The environment for producing the prepregs of the examples and evaluation atmosphere were 25° C.±2° C. temperature and 50% relative humidity unless otherwise stated.

[Carbon Fibers]

"Torayca®" T800G-24K-31E (carbon fibers of 24,000 filaments, 5.9 GPa tensile strength, 294 GPa tensile elastic modulus and 2.0% tensile elongation, produced by Toray Industries, Inc.)

[Epoxy Resins]

(Epoxy Resin [A])

34TGDDE (tetraglycidyl-3,4'-diaminodiphenylether) and 33TGDDE (tetraglycidyl-3,3'-diaminodiphenylether) were synthesized according to the following method.

A four-neck flask equipped with a thermometer, dropping funnel, condenser tube and stirrer was charged with 1221.2 g (13.2 mol) of epichlorohydrin, and while nitrogen purging was performed, the temperature was raised to 70° C. Into the flask, 222.2 g (1.1 mol) of 3,4'-diaminodiphenylether dissolved in 1020 g of ethanol was added dropwise taking 4 hours. Further, stirring was performed for 6 hours, to complete the addition reaction, for obtaining N,N,N',N'-tetrakis (2-hydroxy-3-chloropropyl)-3,4'-diaminodiphenylether. In succession, the temperature in the flask was lowered to 25° C., and subsequently 229 g (2.75 mol) of 48% NaOH aqueous solution was added dropwise taking 2 hours. Then, stirring was performed for further 1 hour. After completion of cyclization reaction, ethanol was distilled away, and 408 g of toluene was used for extraction, then 5% saline solution being used for washing twice. From the organic layer, toluene and epichlorohydrin were removed under reduced pressure, to obtain 398 g of a brown viscous liquid (yield 85.2%). The purity of tetraglycidyl-3,4'-diaminodiphenylether as the main product was 84% (GCarea %). A four-neck flask equipped with a thermometer, dropping funnel, condenser tube and stirrer was charged with 1221.2 g (13.2 mol) of epichlorohydrin, and while nitrogen purging was performed, the temperature was raised to 70° C. Into the flask, 222.2 g (1.1 mol) of 3,3'-diaminodiphenylether dissolved in 1020 g of ethanol was added dropwise taking 4 hours. Further, stirring was performed for 6 hours, to complete the addition reaction, for obtaining N,N,N',N'-tetrakis(2-ydroxy-3-chloropropyl)-3,3'-diaminodiphenylether. In succession, the temperature in the flask was lowered to 25° C., and 229 g (2.75 mol) of 48% NaOH aqueous solution was added dropwise taking 2 hours. Then, stirring was performed for further 1 hour. After completion of cyclization reaction, ethanol was distilled away, and 408 g of toluene was used for extraction, 5% saline solution being used for washing twice. Toluene and epichlorohydrin were removed under reduced pressure from the organic layer, to obtain 395 g of a brown viscous liquid (yield 84.5%). The purity of tetraglycidyl-3,3'-diaminodiphenylether as the main product was 82% (GCarea %).

(Epoxy Resin [B])

"Denacol®" Ex-731 (N-glycidylphthalimide produced by Nagase ChemteX Corporation)

OPP-G (o-phenylphenyl glycidyl ether produced by SANKO Co., Ltd.)

PxGAN (diglycidyl-p-phenoxyaniline produced by Toray Fine Chemicals Co., Ltd.)

4PxPOG (4-phenoxyphenyl glycidyl ether) synthesized by the following method

A four-neck flask equipped with a thermometer, dropping funnel, condenser tube and stirrer was charged with 305.3 g (3.3 mol) of epichlorohydrin, and while nitrogen purging was performed, the temperature was raised to 70° C. Into the flask, 204.8 g (1.1 mol) of 4-phenoxyphenol dissolved in 1020 g of ethanol was added dropwise taking 4 hours. Further, stirring was performed for 6 hours, to complete the addition reaction, for obtaining 4-phenoxy-O-(2-hydroxy-3-chloropropyl)phenol. In succession, the temperature in the flask was lowered to 25° C., and into the flask, 229 g (2.75 mol) of 48% NaOH aqueous solution was added dropwise taking 2 hours. Further, stirring was performed for 1 hour. After completion of cyclization reaction, ethanol was distilled away, and 410 g of toluene was used for extraction, 5% saline solution being used for washing twice. Toluene and epichlorohydrin were removed from the organic layer under reduced pressure, to obtain 215.6 g of a viscous liquid (yield 89%). The purity of 4-phenoxyphenyl glycidyl ether as the main product was 92% (GCarea %).

4 CmPOG (4-α-cumylphenyl glycidyl ether) synthesized by the following method

Glycidylation reaction was performed under the same reaction conditions and procedure as those for the above-mentioned 4-phenoxyphenyl glycidyl ether, to obtain 4-α-cumylphenyl glycidyl ether, except that the compound destined to be a precursor for the synthesized epoxy resin was changed to 4-α-cumylphenol.

(Epoxy Resin [D])

"Araldite®" MY721 (tetraglycidyldiaminodiphenylmethane produced by Huntsman Advanced Materials)

"EPICLON®" 830 (bisphenol F type epoxy resin produced by DIC Corporation)

44TGDDE (tetraglycidyl-4,4'-diaminodiphenylether) was synthesized according to the following method.

A four-neck flask equipped with a thermometer, dropping funnel, condenser tube and stirrer was charged with 1221.2 g (13.2 mol) of epichlorohydrin, and while nitrogen purging was performed, the temperature was raised to 70° C. Into the flask, 222.2 g (1.1 mol) of 4,4'-diaminodiphenylether dissolved in 1020 g of ethanol was added dropwise taking 4 hours. Further, stirring was performed for 6 hours, to complete the addition reaction, for obtaining N,N,N',N'-tetrakis (2-hydroxy-3-chloropropyl)-4,4'-diaminodiphenylether. In succession, the temperature in the flask was lowered to 25° C., and into the flask, 229 g (2.75 mol) of 48% NaOH aqueous solution was added dropwise taking 2 hours. Further, stirring was performed for 1 hour. After completion of cyclization reaction, ethanol was distilled away, and 408 g of toluene was used for extraction, 5% saline solution being used for washing twice. Toluene and epichlorohydrin were removed under reduced pressure from the organic layer, to obtain 416 g of a brown viscous liquid (yield 89%). The purity of tetraglycidyl-4,4'-diaminodiphenylether as the main product was 87% (GCarea %).

[Curing Agent]

SEIKACURE-S (4,4'-diaminodiphenylsulfone, produced by Wakayama Seika Kogyo Co., Ltd.)

3,3'-DAS (3,3'-diaminodiphenylsulfone, produced by Mitsui Fine Chemicals, Inc.)

(Thermoplastic Resin [C])

PES5003P (polyethersulfone produced by Sumitomo Chemical Co., Ltd.)

(1) Definition of 0° of a Carbon Fiber Reinforced Composite Material

As described in JIS K7017 (1999), in the case where the fiber direction of a unidirectional fiber reinforced composite material is defined as the axial direction and where the axial direction is defined as 0° axis, the direction perpendicular to the axis is defined as 90°

(2) Measurement of the 0° Tensile Strength of a Carbon Fiber Reinforced Composite Material A unidirectional prepreg was cut to have a predetermined size, and six sheets of the prepreg were laminated in one direction and subsequently vacuum-packed. The prepreg laminate was cured at a temperature of 180° C. and at a pressure of 6 kg/cm² by using an autoclave for 2 hours, to obtain a unidirectional reinforced material (carbon fiber reinforced composite material). The unidirectional reinforced material was cut to have a width of 12.7 mm and a length of 230 mm, and 1.2 mm and 50 mm long tabs made of a glass fiber reinforced plastic were bonded to both the ends of the unidirectional reinforced material, to obtain a specimen. The specimen was subjected to 0° tensile test (test temperature −60° C.) according to JIS K7073-1988 by using an Instron universal testing machine.

(3) Measurement of the Open-Hole Compression (OHC) Strength of a Carbon Fiber Reinforced Composite Material Under High Temperature Hygroscopic Conditions A unidirectional prepreg was cut to have a predetermined size and 16 sheets of the prepreg were laminated in order to have a configuration of $(+45/0/-45/90\ degrees)_{2S}$. The prepreg laminate was subsequently vacuum-packed and cured at a temperature of 180° C. and at a pressure of 6 kg/cm² by using an autoclave for 2 hours, to obtain a pseudo-isotropic reinforced material (carbon fiber reinforced composite material). The pseudo-isotropic reinforced material was cut to have a rectangular form with a length of 304.8 mm in 0° direction and a length of 38.1 mm in 90° direction, and a circular hole with a diameter of 6.35 mm was drilled at the central portion, to obtain a perforated plate as a specimen. The specimen was subjected to a perforated plate compression test (measured at 82° C. after immersion into hot water of 70° C. for 2 weeks) according to ASTM-D6484 by using an Instron universal testing machine.

Example 1

A kneader was used to knead 50 parts by mass of 34TGDDE, 30 parts by mass of PxGAN and 20 parts by weight of "Araldite®" MY721 at 160° C. for 2 hours, and the mixture was subsequently cooled to 80° C. Then, 40 parts by mass of SEIKACURE-S were added, and the mixture was kneaded to obtain an epoxy resin composition. Table 1 shows the chemical composition and rates (each number in Table 1 is in parts by mass).

Releasing paper was coated with the obtained epoxy resin composition by a resin weight per unit area of 50 g/m² by using a knife coater, to form a resin film. The resin film was overlaid on each of the two sides of carbon fibers (weight per unit area 200 g/m²) paralleled in one direction, and the laminate was heated and pressurized at a temperature of 100° C. and at 1 atmospheric pressure using heat rolls, to impregnate the carbon fibers with the epoxy resin composition, thereby obtaining a prepreg. The volume content of the carbon fibers of the carbon fiber reinforced composite material obtained by curing the prepreg was 58.7%. The volume content was used to calculate the tensile strength availability.

The obtained prepreg was used to obtain a carbon fiber reinforced composite material and to measure the 0° tensile strength and the open-hole compression (OHC) strength under high temperature hygroscopic conditions by performing as described in (2) "Measurement of the 0° tensile strength of a carbon fiber reinforced composite material" and (3) "Measurement of the open-hole compression (OHC) strength of a carbon fiber reinforced composite material under high temperature hygroscopic conditions". The results are shown in Table 1.

Examples 2 to 5 and Comparative Examples 1 to 3

Prepregs were produced as described in Example 1, except that the epoxy resins and the curing agent used and the added amounts thereof were changed as shown in Tables 1 and 4. Likewise the volume content of the carbon fibers was 58.7%.

The obtained prepregs were used to obtain carbon fiber reinforced composite materials and to measure the 0° tensile strengths and the open-hole compression (OHC) strengths under high temperature hygroscopic conditions by performing as described in (2) "Measurement of the 0° tensile strength of a carbon fiber reinforced composite material" and (3) "Measurement of the open-hole compression (OHC) strength of a carbon fiber reinforced composite material under high temperature hygroscopic conditions". The results are shown in Tables 1 and 4.

Example 6

A kneader was used to knead 60 parts by mass of 34TGDDE, 40 parts by mass of PxGAN and 10 parts by mass of PES5003P at 160° C., and it was visually confirmed that PES5003P was dissolved. Then, the mixture was cooled to 80° C., and 35 parts by mass of SEIKACURE-S were added. The mixture was kneaded to produce an epoxy resin composition. Table 2 shows the chemical composition and rates (each number in table 2 is in parts by mass).

Releasing paper was coated with the obtained epoxy resin composition by a resin weight per unit area of 50 g/m² by using a knife coater, to form a resin film. The resin film was overlaid on each of the two sides of carbon fibers (weight per unit area 200 g/m²) paralleled in one direction, and the laminate was heated and pressurized at a temperature of 100° C. and at 1 atmospheric pressure, to impregnate the carbon fibers with the epoxy resin composition, thereby obtaining a prepreg. The volume content of the carbon fibers in the carbon fiber reinforced composite material obtained by molding the prepreg was 58.7%.

The obtained prepreg was used to obtain a carbon fiber reinforced composite material and to measure the 0° tensile strength and the open-hole compression (OHC) strength under high temperature hygroscopic conditions by performing as described in (2) "Measurement of the 0° tensile strength of a carbon fiber reinforced composite material" and (3) "Measurement of the open-hole compression (OHC) strength of a carbon fiber reinforced composite material under high temperature hygroscopic conditions". The results are shown in Table 3.

Examples 7 to 18 and Comparative Examples 4, 5 and 7

Prepregs were produced as described in Example 1, except that the epoxy resins and the curing agent used and the added amounts thereof were changed as shown in Tables 2 to 5. The volume contents of the carbon fibers in the carbon fiber reinforced composite materials obtained by molding the prepregs were 58.7%.

The obtained prepregs were used to obtain carbon fiber reinforced composite materials and to measure the 0° tensile strengths and the open-hole compression (OHC) strengths under high temperature hygroscopic conditions by performing as described in (2) "Measurement of the 0° tensile strength of a carbon fiber reinforced composite material" and (3) "Measurement of the open-hole compression (OHC) strength of a carbon fiber reinforced composite material under high temperature hygroscopic conditions". The results are shown in Tables 2 to 5.

Comparative Example 6

A kneader was used to knead 40 parts by mass of 34TGDDE and 60 parts by mass of PxGAN at 160° C. for 2 hours, and subsequently the mixture was cooled to 80° C. Twenty five parts by mass of SEIKACURE-S were added, and the mixture was kneaded to produce an epoxy resin composition. Table 4 shows the chemical composition and rates (each number in Table 4 is in parts by mass).

Releasing paper was coated with the obtained epoxy resin composition by a resin weight per unit area of 50 g/m² by using a knife coater, to form a resin film. The resin film was overlaid on each of the two sides of carbon fibers (weight per unit area 200 g/m²) paralleled in one direction, and the laminate was heated and pressurized at a temperature of 100° C. and at 1 atmospheric pressure, to impregnate the carbon fibers with the epoxy resin composition, thereby obtaining a prepreg.

It was attempted to obtain a carbon fiber reinforced composite material by using the obtained prepreg and performing as described in (2) "Measurement of the 0° tensile strength of a carbon fiber reinforced composite material" and (3) "Measurement of the open-hole compression (OHC) strength of a carbon fiber reinforced composite material under high temperature hygroscopic conditions". The carbon fiber reinforced composite material was cracked on the surface.

TABLE 1

|  |  | Example 1 | Example 2 | Example 3 | Example 4 | Example 5 |
|---|---|---|---|---|---|---|
| Epoxy resin | Epoxy resin [A] |  |  |  |  |  |
| composition for | 34TGDDE | 50 | 50 | 50 | 50 | 50 |
| use in a carbon | 33TGDDE |  |  |  |  |  |
| fiber reinforced | Epoxy resin [B] |  |  |  |  |  |
| composite | PxGAN | 30 |  |  |  |  |
| material | 4PxPOG |  | 30 |  |  |  |
|  | 4CmPOG |  |  | 30 |  |  |
|  | Ex-731 |  |  |  | 30 |  |
|  | OPP-G |  |  |  |  | 30 |
|  | Thermoplastic resin [C] |  |  |  |  |  |
|  | PES5003P |  |  |  |  |  |
|  | Epoxy resin [D] |  |  |  |  |  |
|  | MY721 | 20 | 20 | 20 | 20 | 20 |
|  | 4TGDDE |  |  |  |  |  |
|  | EPICLON830 |  |  |  |  |  |

TABLE 1-continued

|  |  | Example 1 | Example 2 | Example 3 | Example 4 | Example 5 |
|---|---|---|---|---|---|---|
|  | Curing agent |  |  |  |  |  |
|  | SEIKACURE-S | 40 | 35 | 35 | 37 | 37 |
|  | 3,3'-DAS |  |  |  |  |  |
| Properties of composite material | Compressive strength of perforated plate (Mpa) | 263 | 256 | 254 | 257 | 260 |
|  | Tensile strength (Mpa) | 2820 | 2780 | 2740 | 2880 | 2890 |
|  | Tensile strength availability | 81.4% | 80.3% | 79.1% | 83.2% | 83.4% |

TABLE 2

|  |  | Example 6 | Example 7 | Example 8 | Example 9 |
|---|---|---|---|---|---|
| Epoxy resin composition for use in a carbon fiber reinforced composite material | Epoxy resin [A] |  |  |  |  |
|  | 34TGDDE | 60 | 60 | 80 | 20 |
|  | 33TGDDE |  |  |  |  |
|  | Epoxy resin [B] |  |  |  |  |
|  | PxGAN | 40 | 40 |  |  |
|  | 4PxPOG |  |  | 20 | 50 |
|  | 4CmPOG |  |  |  |  |
|  | Ex-731 |  |  |  |  |
|  | OPP-G |  |  |  |  |
|  | Thermoplastic resin [C] |  |  |  |  |
|  | PES5003P | 10 | 10 | 10 | 10 |
|  | Epoxy resin [D] |  |  |  |  |
|  | MY721 |  |  |  | 30 |
|  | 44TGDDE |  |  |  |  |
|  | EPICLON830 |  |  |  |  |
|  | Curing agent |  |  |  |  |
|  | SEIKACURE-S | 35 |  |  |  |
|  | 3,3'-DAS |  | 35 | 35 | 35 |
| Properties of composite material | Compressive strength of perforated plate (Mpa) | 265 | 285 | 288 | 275 |
|  | Tensile strength (Mpa) | 3050 | 2960 | 2760 | 2880 |
|  | Tensile strength availability | 88.1% | 85.5% | 79.7% | 83.2% |

TABLE 3

|  |  | Example 10 | Example 11 | Example 12 | Example 13 | Example 14 | Example 15 |
|---|---|---|---|---|---|---|---|
| Epoxy resin composition for use in a carbon fiber reinforced composite material | Epoxy resin [A] |  |  |  |  |  |  |
|  | 34TGDDE | 50 | 50 | 50 | 50 | 50 | 50 |
|  | 33TGDDE |  |  |  |  |  |  |
|  | Epoxy resin [B] |  |  |  |  |  |  |
|  | PxGAN |  |  |  |  | 25 | 50 |
|  | 4PxPOG | 10 | 20 | 40 | 50 |  |  |
|  | 4CmPOG |  |  |  |  |  |  |
|  | Ex-731 |  |  |  |  |  |  |
|  | OPP-G |  |  |  |  |  |  |
|  | Thermoplastic resin [C] |  |  |  |  |  |  |
|  | PES5003P | 10 | 10 | 10 | 10 | 10 | 10 |
|  | Epoxy resin [D] |  |  |  |  |  |  |
|  | MY721 | 40 | 30 | 10 |  |  |  |
|  | 44TGDDE |  |  |  |  |  |  |
|  | EPICLON830 |  |  |  |  | 25 |  |
|  | Curing agent |  |  |  |  |  |  |
|  | SEIKACURE-S |  |  |  |  |  |  |
|  | 3,3'-DAS | 40 | 37 | 34 | 30 | 35 | 35 |
| Properties of composite material | Compressive strength of perforated plate (Mpa) | 285 | 282 | 283 | 274 | 270 | 285 |
|  | Tensile strength (Mpa) | 2770 | 2840 | 3050 | 3010 | 3100 | 3160 |
|  | Tensile strength availability | 80.0% | 82.0% | 88.1% | 86.9% | 89.5% | 91.2% |

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Epoxy resin composition for use in a carbon fiber reinforced composite material | Epoxy resin [A] |  |  |  |  |  |  |
|  | 34TGDDE |  | 10 | 90 | 10 | 90 | 40 |
|  | 33TGDDE |  |  |  |  |  |  |
|  | Epoxy resin [B] |  |  |  |  |  |  |
|  | PxGAN |  |  |  |  |  |  |
|  | 4PxPOG |  |  |  | 10 |  |  |
|  | 4CmPOG |  |  |  |  | 10 | 60 |
|  | Ex-731 |  |  |  |  |  |  |
|  | OPP-G |  |  |  |  |  |  |
|  | Thermoplastic resin [C] |  |  |  |  |  |  |
|  | PES5003P |  |  |  | 10 | 10 |  |
|  | Epoxy resin [D] |  |  |  |  |  |  |
|  | MY721 | 100 | 90 |  | 90 |  |  |
|  | 4,4'TGDDE |  |  |  |  |  |  |
|  | EPICLON830 |  |  |  |  |  |  |
|  | Curing agent |  |  |  |  |  |  |
|  | SEIKACURE-S | 50 | 50 | 35 | 50 | 35 | 25 |
|  | 3,3'-DAS |  |  |  |  |  |  |
| Properties of composite material | Compressive strength of perforated plate (Mpa) | 252 | 254 | 264 | 252 | 261 | Crack |
|  | Tensile strength (Mpa) | 2130 | 2150 | 2150 | 2250 | 2260 |  |
|  | Tensile strength availability | 61.5% | 62.1% | 62.1% | 65.0% | 65.3% |  |

TABLE 5

|  | Example 16 | Example 17 | Example 18 | Comparative Example 7 |
|---|---|---|---|---|
| Epoxy resin [A] |  |  |  |  |
| 34TGDDE |  |  |  |  |
| 33TGDDE | 50 | 50 | 50 |  |
| Epoxy resin [B] |  |  |  |  |
| PxGAN | 30 |  | 50 | 40 |
| 4PxPOG |  |  |  |  |
| 4CmPOG |  |  |  |  |
| Ex-731 |  | 30 |  |  |
| OPP-G |  |  |  |  |
| Thermoplastic resin [C] |  |  |  |  |
| PES5003P | 10 | 10 | 10 | 10 |
| Epoxy resin [D] |  |  |  |  |
| MY721 | 20 | 20 |  |  |
| 4,4'TGDDE |  |  |  | 60 |
| EPICLON830 |  |  |  |  |
| Curing agent |  |  |  |  |
| SEIKACURE-S |  |  |  |  |
| 3,3'-DAS | 40 | 37 | 35 | 40 |
| Compressive strength of perforated plate (Mpa) | 275 | 268 | 295 | 270 |
| Tensile strength (Mpa) | 2800 | 2830 | 3100 | 2510 |
| Tensile strength availability | 80.8% | 81.7% | 89.5% | 72.5% |

INDUSTRIAL APPLICABILITY

The carbon fiber reinforced composite material obtained by using the epoxy resin composition of this invention is excellent in mechanical strength under more severe service environments such as high temperature/high humidity and low temperature, and therefore can be especially suitably used for structural materials. For example, the carbon fiber reinforced composite material can be suitably used for aerospace applications including primary structural materials such as main wings, empennages and floor beams, secondary structural materials such as flaps, ailerons, cowlings, fairings and interior materials, rocket motor cases, structural materials of artificial satellites, etc. Further, it can be suitably used for general industrial applications including structural materials of moving bodies such as motor vehicles, ships and rolling stock, drive shafts, plate springs, blades of wind mills, pressure vessels, fly wheels and papermaking rollers, and civil engineering and architectural material applications including roof materials, cables, reinforcing bars and repairing and reinforcing materials. Furthermore, it can be suitably used for sporting applications including golf shafts, fishing rods, rackets of tennis, badminton and squash, sticks of hockey, ski poles, etc.

The invention claimed is:

1. An epoxy resin composition for use in a carbon fiber reinforced composite material, comprising at least the following components [A] and [B], wherein the content of [A] is 20 to 80 mass % and the content of [B] is 25 to 50 mass % per 100 mass % as the total amount of the mixed epoxy resins,

[A]: an epoxy resin with one or more amine type glycidyl groups at the meta position(s), wherein [A] is tetraglycidyl-3,4'-diaminodiphenylether or tetraglycidyl-3,3'-diaminodiphenylether,

[B]: a bifunctional epoxy resin with two or more four- or larger-membered ring structures and one amine type glycidyl group directly bonded to one of the ring structures, wherein [B] contains a diphenylether, and the epoxy resin [B] is at least one selected from the group consisting of diglycidyl-p-phenoxyaniline, diglycidyl-4-(4-methylphenoxy)aniline, diglycidyl-4-(3-methlyphenoxy)aniline, diglycidyl-4-(2-methlyphenoxy)aniline, diglycidyl-4-(4-ethylphenoxy)aniline, diglycidyl-4-(3-ethylphenoxy)aniline, diglycidyl-4-(2-ethylphenoxy)aniline, diglycidyl-4-(4-propylphenoxy)aniline, diglycidyl-4-(4-tert-butylphenoxy)aniline, diglycidyl-4-(4-cyclohexylphenoxy)aniline, diglycidyl-4-(3-cyclohexylphenoxy)aniline, diglycidyl-4-(2-cyclohexylphenoxy)aniline, diglycidyl-4-(4-methoxyphenoxy)aniline, diglycidyl-4-(3-methoxyphenoxy)aniline, diglycidyl-4-(2-methoxyphenoxy)aniline, diglycidyl-4-(3-phenoxyphenoxy)aniline, diglycidyl-4-(4-phenoxyphenoxy aniline, diglycidyl-4-[4-trifluoromethyl)phenoxy]aniline, diglycidyl-4-[3-(trifluoromethyl)phenoxy]aniline, diglycidyl-4-[2-(trifluoromethyl)phenoxyl]aniline, diglycidyl-p-(2-naphthyloxyphenoxy)aniline, diglycidyl-p-(1-naphthyloxyphenoxy)aniline, diglycidyl-4-[(1,1'-biphenyl-4-yl)oxy]aniline, diglycidyl-4-(4-nitrophenoxy)aniline, diglycidyl-4-(3-nitrophenoxy)aniline diglycidyl-4-(2-nitrophenoxy)aniline, diglycidyl-4-(4-methylphenoxy)aniline diglycidyl-4-(3-methylphenoxy)aniline, diglycidyl-4-(2-methylphenoxy)aniline, diglycidyl-4-(4-ethylphenoxy)aniline, diglycidyl-4-(3-ethylphenoxy)aniline, diglycidyl-4-(4-tert-butylphenoxy)aniline, diglycidyl-4-(4-cyclohexylphenoxy)aniline, diglycidyl-p-(2-naphthyloxyphenoxy)aniline.

2. An epoxy resin composition for use in a carbon fiber reinforced composite material, according to claim 1, which further contains the following [C],

[C]: A thermoplastic resin dissolvable in the epoxy resins.

3. A prepreg comprising carbon fibers impregnated with the epoxy resin composition set forth in claim 1.

4. A carbon fiber reinforced composite material obtained by curing the prepreg set forth in claim 3.

5. A carbon fiber reinforced composite material comprising the cured resin product obtained by curing the epoxy resin composition set forth in claim 1, and carbon fibers.

6. A aircraft structural member or windmill blade comprising the carbon fiber reinforced composite material according to claim 5.

* * * * *